US012766355B2

(12) United States Patent
Jittu

(10) Patent No.: US 12,766,355 B2
(45) Date of Patent: Oct. 20, 2026

(54) FIRE EXTINGUISHING SYSTEM

(71) Applicant: Alexander I. Jittu, Chesterfield, MI (US)

(72) Inventor: Alexander I. Jittu, Chesterfield, MI (US)

( * ) Notice: Subject to any disclaimer, the term of this patent is extended or adjusted under 35 U.S.C. 154(b) by 0 days.

(21) Appl. No.: 17/416,073

(22) PCT Filed: Feb. 18, 2021

(86) PCT No.: PCT/US2021/018515
§ 371 (c)(1),
(2) Date: Jun. 18, 2021

(87) PCT Pub. No.: WO2021/168071
PCT Pub. Date: Aug. 26, 2021

(65) Prior Publication Data
US 2023/0173315 A1 Jun. 8, 2023

Related U.S. Application Data

(60) Provisional application No. 62/995,879, filed on Feb. 19, 2020.

(51) Int. Cl.
*A62C 27/00* (2006.01)
*A62C 31/00* (2006.01)
(Continued)

(52) U.S. Cl.
CPC .............. *A62C 27/00* (2013.01); *A62C 31/00* (2013.01); *B05B 7/1404* (2013.01);
(Continued)

(58) Field of Classification Search
CPC ....... A62C 27/00; A62C 31/00; B05B 7/1404; B05B 7/1486; B05B 15/25; B60P 3/22; G05D 1/0022; B62D 55/00
(Continued)

(56) References Cited

U.S. PATENT DOCUMENTS 3,567,136 A * 3/1971 Garrett .................. A62C 27/00 239/587.2
3,724,554 A * 4/1973 Rupert .................. A62C 27/00 169/24
(Continued)

FOREIGN PATENT DOCUMENTS

CN 110013636 A1 7/2019
EP 3338899 A1 * 6/2018 ............. B05B 15/55
(Continued)

OTHER PUBLICATIONS

PCT Search Report for related application PCT/US2021/018515, dated Apr. 28, 2021.

*Primary Examiner* — Kevin Edward Schwartz
(74) *Attorney, Agent, or Firm* — BROOKS KUSHMAN P.C.

(57) ABSTRACT

A remote-controlled powder fire extinguishing system includes a robotic mobile unit including a powder storage unit, a powder fluidization system, and a powder distribution system, the mobile unit being configured to distribute a fluidized powder onto a location affected by a fire, a remote control center, operable outside of the location affected by the fire, including a controller programmed to remotely communicate with and control the mobile unit, the powder storage unit, the powder fluidization system, and the powder distribution system, and a device configured to provide wireless connection between the mobile unit and the remote control center.

4 Claims, 8 Drawing Sheets

(51) Int. Cl.
*B05B 7/14* (2006.01)
*B05B 15/25* (2018.01)
*B60P 3/22* (2006.01)
*B62D 55/00* (2006.01)
*G05D 1/00* (2024.01)

(52) U.S. Cl.
CPC .............. *B05B 7/1486* (2013.01); *B60P 3/22* (2013.01); *G05D 1/0022* (2013.01); *B05B 15/25* (2018.02); *B62D 55/00* (2013.01)

(58) Field of Classification Search
USPC .......................................................... 169/47
See application file for complete search history.

(56) References Cited

U.S. PATENT DOCUMENTS

| | | | | | |
|---|---|---|---|---|---|
| 3,840,074 | A * | 10/1974 | Clark | A62C 31/24 | 239/587.2 |
| 4,480,947 | A * | 11/1984 | Nagasaka | G01F 1/74 | 406/14 |
| 4,488,603 | A * | 12/1984 | Schmittmann | A62C 27/00 | 169/54 |
| 4,662,309 | A * | 5/1987 | Mulder | B05B 14/48 | 118/308 |
| 4,743,143 | A * | 5/1988 | Nagasaka | G01F 1/74 | 406/14 |
| 5,474,609 | A * | 12/1995 | Mulder | B05B 7/1454 | 118/308 |
| 5,487,624 | A * | 1/1996 | Toyota | B05B 12/085 | 406/14 |
| 6,176,647 | B1 * | 1/2001 | Itoh | B05B 7/144 | 406/176 |
| 6,810,929 | B1 * | 11/2004 | Tansey | B65B 1/08 | 141/69 |
| 7,182,144 | B2 | 2/2007 | Baba et al. | | |
| 7,264,062 | B1 | 9/2007 | Ham | | |
| 8,381,826 | B2 | 2/2013 | Al-Azemi | | |
| 8,978,578 | B2 * | 3/2015 | Jittu | B05B 14/48 | 118/313 |
| 2005/0013193 | A1 * | 1/2005 | Murphy | B05B 7/1404 | 366/163.2 |
| 2006/0185858 | A1 * | 8/2006 | Baba | B25J 11/00 | 169/70 |
| 2007/0295836 | A1 * | 12/2007 | Jittu | B05B 7/1404 | 239/311 |
| 2009/0188567 | A1 * | 7/2009 | McHugh | A62C 37/50 | 137/15.05 |
| 2011/0232925 | A1 * | 9/2011 | Al-Azemi | A62C 27/00 | 169/52 |
| 2012/0312564 | A1 * | 12/2012 | Seliverstov | A62C 35/68 | 169/68 |
| 2020/0197733 | A1 * | 6/2020 | Wooley | G08B 29/183 | |
| 2021/0162247 | A1 | 6/2021 | Kovalev et al. | | |

FOREIGN PATENT DOCUMENTS

| | | | |
|---|---|---|---|
| WO | 2019043574 | A1 | 3/2019 |
| WO | 2019190348 | A1 | 10/2019 |

* cited by examiner

FIRE EXTINGUISHING SYSTEM

CROSS-REFERENCE TO RELATED APPLICATIONS

This application is the U.S. National Phase of PCT Appln. No. PCT/US2021/018515 filed Feb. 18, 2021, which claims the benefit of U.S. provisional application Ser. No. 62/995,879 filed Feb. 19, 2020, the disclosures of which are hereby incorporated in their entirety by reference herein.

TECHNICAL FIELD

The present disclosure relates to a fire extinguishing system, specifically a system using remote-controlled devices to extinguish, contain, or control fires, and methods of using the same.

BACKGROUND

Yearly, fire damage causes billions of dollars in direct damage and about 350,000 home structure fires demand attention of fire departments in the U.S. alone. Far more tragic than destruction of property is loss of human life, animals, and natural habitats due to fire. While traditional fire-fighting techniques have been implemented for centuries, they place lives of fire fighters at risk and have relatively low efficiency.

SUMMARY

In one or more embodiments, a remote-controlled powder fire extinguishing system is disclosed. The system includes a robotic mobile unit including a powder storage unit, a powder fluidization system, and a powder distribution system, the mobile unit being configured to distribute a fluidized powder onto a location affected by a fire. The system also includes a remote control center, operable outside of the location affected by the fire, including a controller programmed to remotely communicate with and control the mobile unit, the powder storage unit, the powder fluidization system, and the powder distribution system. The system also includes a device configured to provide wireless connection between the mobile unit and the remote control center. The mobile unit may be unmanned. The device may include a satellite, weather balloon, or both. The device may be a deployable cell tower. The powder fluidization system may include an air/nitrogen mixing unit. The remote control center may be a vehicle. The powder storage unit may be removable from the mobile unit.

In another embodiment, a powder fire extinguishing system is disclosed. The system includes a powder storage unit including a fluidization plate configured to fluidize powder in the storage unit. The system also includes a mobile body, located downstream from and connected to the powder storage unit, having a container, configured to accept the fluidized powder, and a powder feed device located downstream from the container, configured to distribute the powder to a tube via a pivotable connector. The tube may be branching into a powder distribution system including a plurality of branches, each terminating with a plurality of powder applicators. The mobile body may be remotely controlled. The plurality of branches may include a loop and at least one diverter configured to control the powder flow via the loop. The container may include a fluidization plate. The powder storage unit may be spatially removed from the mobile body and connected to the mobile body at least via one powder carrying hose. The powder storage unit may have a pressurized port configured to receive air/nitrogen mixture for powder fluidization. The powder storage unit may be mobile.

In yet another embodiment, a remotely-controlled method of extinguishing fire is disclosed. The method may include deploying one or more remotely controllable robotic mobile units to a location affected by a fire, each one of the robotic mobile units being unmanned and including a powder storage unit, a powder fluidization system, and a powder distribution system. The method may also include fluidizing the powder in the one or more robotic mobile units by supplying pressurized gas to the powder fluidization system. The method may further include operating the one or more robotic mobile units from a remote control center, operable outside of the location affected by the fire, the operating including navigating the robotic mobile units, controlling distribution of the fluidized powder within the robotic mobile units, and managing powder distribution from the robotic mobile units. The method may include applying the fluidized powder onto the location affected by the fire to extinguish the fire. The pressurized gas may be air or air/nitrogen mixture. The method may further include establishing a wireless communication between the one or more robotic mobile units and the remote control center via a satellite. The method may also include refilling the one or more robotic mobile units while the robotic mobile units are present at the location affected by the fire. The method may further include collecting data from one or more sensors of the one or more robotic mobile units and transmitting the data to the remote control center. The method may also include maintaining the powder in the fluidized state within the robotic mobile units until the powder is applied onto the fire. The applying may include alternating powder distribution from different robotic mobile units.

DETAILED DESCRIPTION

Figure 1:
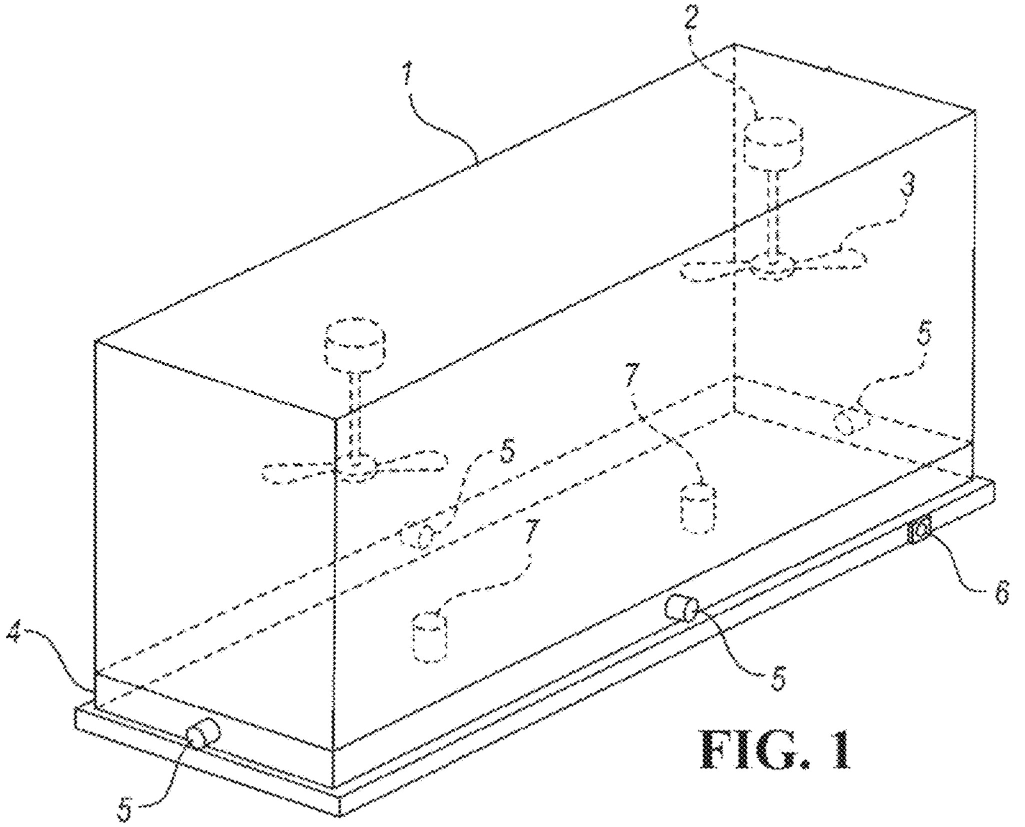
FIG. 1 is a schematic perspective view of a non-limiting example of a primary powder distribution system of the fire extinguishing system according to one or more embodiments disclosed herein.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word “about” in describing the broadest scope of the disclosure. Practice within the numerical limits stated is generally preferred. Also, unless expressly stated to the contrary: percent, “parts of,” and ratio values are by weight; the description of a group or class of materials as suitable or preferred for a given purpose in connection with the disclosure implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form “a,” “an,” and “the” comprise plural referents unless the context clearly indicates otherwise. For example, reference to a component in the singular is intended to comprise a plurality of components.

As used herein, the term “and/or” means that either all or only one of the elements of said group may be present. For example, “A and/or B” means “only A, or only B, or both A and B”. In the case of “only A,” the term also covers the possibility that B is absent, i.e. “only A, but not B”.

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term “comprising” is synonymous with “including,” “having,” “containing,” or “characterized by.” These terms are inclusive and open-ended and do not exclude additional, unrecited elements or method steps.

The phrase “consisting of” excludes any element, step, or ingredient not specified in the claim. When this phrase appears in a clause of the body of a claim, rather than immediately following the preamble, it limits only the element set forth in that clause; other elements are not excluded from the claim as a whole.

The phrase “consisting essentially of” limits the scope of a claim to the specified materials or steps, plus those that do not materially affect the basic and novel characteristic(s) of the claimed subject matter.

With respect to the terms “comprising,” “consisting of,” and “consisting essentially of,” where one of these three terms is used herein, the presently disclosed and claimed subject matter can include the use of either of the other two terms.

The term “one or more” means “at least one” and the term “at least one” means “one or more.” The terms “one or more” and “at least one” include “plurality” as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fire, as a valuable source of heat and light, contributed to dramatic changes in the habits of early humans including development of agriculture, land clearing, cooking, generating heat, smelting, forging, and later contributed to numerous industrial advances of mankind. Fire may also positively affect the environment around the planet, stimulates growth, maintains various ecological systems. Regular occurrence of fires in certain areas has even led to adaptation of certain species to depend on fires in their life cycles. Yet fire also poses serious negative effects such as hazard to life and property and atmospheric pollution. Furthermore, less obvious but equally negative effects of fires occur after the fire is extinguished—water contamination, loss of habitats, soil erosion, loss of soil fertility, landslides, debris flow, etc.

As growing populations around the world demand more space and the climate changes, fires have become more and more common. Unwanted fires result in billions of dollars of property damage and loss every year. This is true especially in inhabited areas where personal and industrial properties are lost or damaged. Additionally, thousands of lives are lost due to fire accidents each year. Multimillion investments are made yearly to prevent fires, treat fires, and train and employ firefighters capable of extinguishing fires. But the traditional firefighting techniques place the firefighters at risk and do not have the desired efficiency.

Among the traditional techniques, outside fires on land surface and in forests are mainly extinguished by dropping water from helicopters, drones, and airplanes. Additional ways to extinguish fires include applying water from water hoses onto the affected area. Yet, these techniques are contradictory to its intent because when the water is exposed to high temperatures, such as those present in fires, the water dissociates into hydrogen and oxygen. Both of these elements feed the fire instead of helping to quench it.

Fire starts when a flammable or combustible material combines with a sufficient amount of an oxidizer in presence of heat or a temperature above the flesh point of the fuel/oxidizer mix, and is able to sustain a rate of rapid oxidation producing a chain reaction. When water applied onto the fire dissociates, hydrogen functions as a combusting gas, and oxygen increases power of the fire. Under certain conditions, application of water does not lead to the fire being extinguished, but on the contrary, being fueled and made stronger.

Hence, there is an urgent need to provide alternative techniques which would lead to unwanted fires being extinguished while increasing the extinguishing efficiency and decreasing loss of lives and property.

In one or more embodiments, a fire extinguishing system is disclosed. The system is a fire extinguishing system. The system is configured to extinguish a building fire, an industrial complex fire, a house fire, a forest fire, a grassland fire, or other types of fire. The system is configured to extinguish, stop, minimize, contain, or subdue outdoors fires even under difficult climatic conditions, weather conditions, and other factors such as high wind, high temperature, dry vegetation which normally pose serious hazard to traditional firefighting methods.

The system is structured to utilize a powder instead of water to extinguish the fire. Non-limiting examples of the powder may include calcium carbonate ($CaCO_3$) powder, sodium bicarbonate ($NaHCO_3$) powder, a granulated sand powder, talc powder, a fire extinguishing rated powder, a non-flammable powder, or a combination thereof. When applied onto the fire, the powder may coat the fuel, separating the fuel form the oxygen in the air. The powder also interrupts the chemical reaction causing the fire.

The powder is a granular powder, which is fluidizable or fluidized. The powder may be fluidized powder. Fluidization is a process similar to liquefaction in which a granular material such as powder is converted from a static solid-like state to a dynamic fluid-like state. When fluidized, a bed of solid particles of the powder behaves like a fluid, a liquid or gas. The powder may be a fixed bed.

The system may include a plurality of components, devices, and subsystems. For example, the system 100 may include one or more transportation units, communication units, powder storage units, powder distribution units. The powder storage unit 1 may also serve as a first powder distribution unit. The distribution from the powder storage unit 1 is a primary distribution to a secondary distribution system disclosed below.

The fluidized powder may be stored inside of one or more powder storage units. The powder storage units serve to store and contain the powder, prevent the powder from coming into contact with contaminants, excessive amount of moisture, extreme climate conditions, or other undesirable conditions. The powder storage units may be transportable to the area where the fire needs to be extinguished.

Because the powder is sensitive to environmental conditions such as temperature and viscosity, the powder storage units 1 are configured to maintain the powder in its fluidized form. The powder storage unit 1 may be made from a material configured to maintain the powder in its fluidized form, remain in a floating state, prevent clumping of the powder granules, etc. As such, the powder storage unit 1 may be made from metal, ceramic, composite, or another high-temperature resistant material on the outside, include insulation and/or cooling materials on the inside to protect the powder from hazardous conditions in the hazard zone.

A non-limiting example of a powder storage unit 1 may be a container, vessel, canister, capsule, tank, hopper, housing, or the like. A non-limiting example of the powder storage unit 1 is shown in FIG. 1. The powder storage unit 1 may include one or more stirring devices, stirrers, or agitators 3. The stirring devices 3 may be run by a motor 2. The stirring device 3 may be suspended from the top portion or ceiling of the powder storage unit 1. Alternatively, or in addition, one or more stirrers 3 may be protruding towards the center of the container 1 from one or more sides or the bottom of the container 1.

As can be further seen in FIG. 1, the powder storage unit 1 may include a fluidization plate 4. The fluidization plate 4 or a fluid bed plate is configured to diffuse, aerate, and fluidize the powder. The fluidization plate 4 may be a flat panel. The fluidization plate 4 may be installed level with the bottom portion of the unit 1 or at an angle such that the plate 4 is inclined towards an opening 5, outlet 7, or another portion of the unit 1. The fluidization plate 4 may be made from a porous material such as porous plastic. The porous material may be highly chemically inert. The pores may be one-, two-, multi-, or omnidirectional to affect “Torturous path” filtration. The fluidization plate 4 is configured to fluidize the powder, maintain the powder in movement, or both. The fluidization plate 4 is configured to impart desired fluidity to the powder as a predetermined quantity of air is added to the unit 1, for example in regular intervals.

The unit 1 has one or more ports 5. The ports 5 may be openings, cavities, orifices, or air inlets configured to provide or supply air/air-nitrogen mixture for the powder fluidization. The air may be pressurized in an air compressor, dried, or otherwise conditioned before the air enters the unit 1. The port(s) 5 may be a powder pressure port. The port(s) 5 may be located at the top, bottom, and/or side of the unit 1. The port(s) 5 may be located adjacent or immediately adjacent to the fluidization plate 4.

The powder storage unit 1 may further include one or more discharge openings, ports, orifices, or outlets 7. The discharge openings 7 may be configured to distribute the powder from the powder storage unit 1 to another system, device, unit. The outlet(s) 7 may be located at the top, bottom, and/or side of the unit 1.

The unit 1 may also include a scale 6 to weigh the amount of powder present in the unit 1, meter the correct amount into the unit 1, remove and/or monitor the amount of powder being distributed from the unit 1, or trigger a signal for powder demand.

The powder may be loaded into the powder storage unit 1 from a vehicle such as a helicopter, drone, large volume unloaders, tank, or another container. The loading may happen via an opening located on the top portion, bottom portion, or side of the unit 1. One or more sides, the top, or bottom may have a removable panel configured to provide a relatively large opening for entry of the powder into the unit 1. Alternatively, the opening may be relatively small.

The powder storage unit 1 may be a solitary object or an object forming a permanent or temporary part of a system. The system may be a land system, an air system, a building, a vehicle, a mobile unit. The vehicle/mobile unit may be a land vehicle such as an automobile, bus, a vehicle for transportation of goods, off-road vehicle, tracked vehicle, train, amphibious vehicle, aircraft, space craft, watercraft, or the like. The powder storage unit 1 may form an integral part of the vehicle/mobile unit. The powder storage unit 1 may be movable on and off the vehicle/mobile unit. The powder storage unit 1 may be permanently or temporarily fixed, attached, secured to the vehicle/mobile unit, for example via hardware such as tracks, brackets on the vehicle bed.

Figure 2:
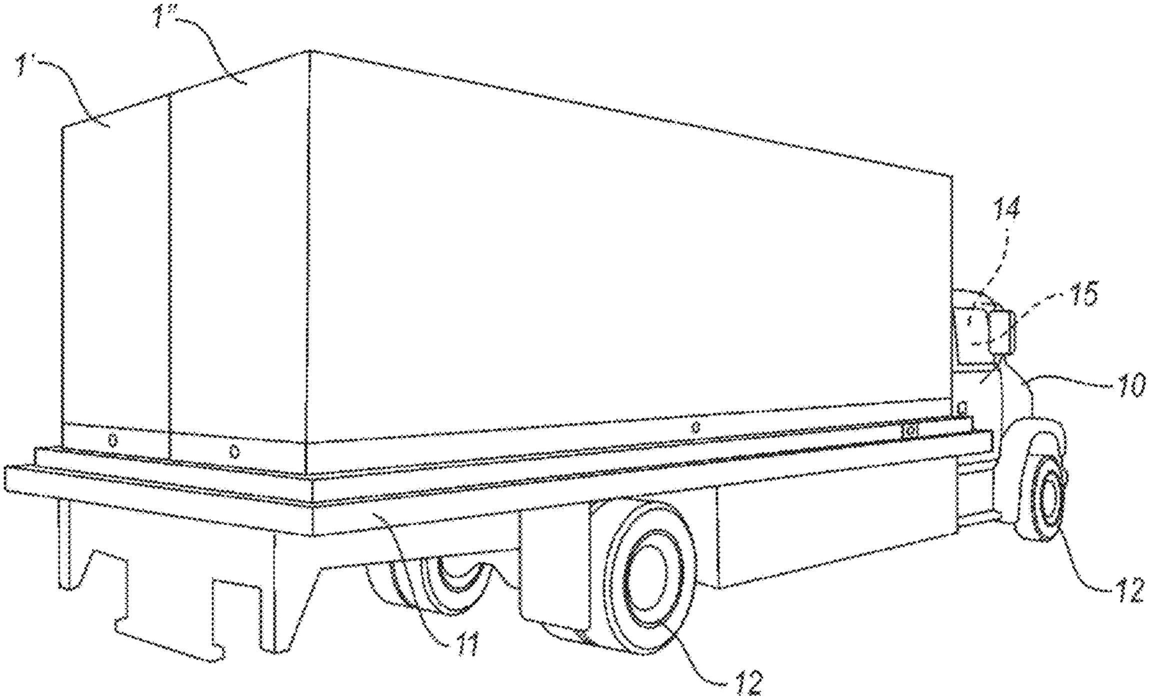
FIG. 2 is a perspective view of a vehicle configured to transport the primary powder distribution system of FIG. 1.

An example of such embodiment is shown in FIG. 2. FIG. 2 shows a vehicle 10 such as a truck including the powder storage unit 1 as part of a vehicle bed 11. The vehicle 10 may be mobile due to presence of wheels 12. Instead of wheels, other types of devices allowing movement and transportation of the vehicle 10 from one place to another may be included. The vehicle 10 may include one or more powder storage units 1. The storage units 1 may be stackable, securable against one another, have complimentary shape, or a combination thereof.

The vehicle 10 may include a cabin 14 or another compartment housing one or more control devices or items 15 including, but not limited to, one or more computers, human machine interface (HMI), programmable logic controller (PLC), control boards, steering systems, the like, or a combination thereof. The control devices 15 are configured or programmed to control direction and movement of the vehicle 10, control powder distribution from the powder storage units 1 and other systems, receive input such as signal from a remote system, collect information or data from cameras, sensors, or both, generate and transmit output to a remote system, etc.

The powder from the powder storage unit 1 may be distributed into a secondary powder distribution system 16. The distribution may be provided via a tube, tubing, hose, pipe, or another connector 17. The hose 17 may be flexible, rigid, extendable, having fixed dimensions, having at least one dimension which is adjustable. The at least one dimension may be diameter or length. More than one hose 17 is contemplated. For example, each powder storage unit 1 may distribute powder via its own hose 17, as is shown in FIGS. 3A and 3B.

An example of the secondary distribution system 16 may be a robot, a remotely controlled device, or a unit capable of accepting the powder and forwarding the powder onto the fire to be extinguished or to another distribution system. The secondary distribution system 16 may be free of manpower, be unmanned, be controlled automatically, remotely, or a combination thereof. The secondary distribution system 16 may be configured to accept the powder from the powder storage system 1, temporarily hold the powder, and distribute the powder towards the fire or to a tertiary distribution system. Because the powder hold is only temporary, the secondary distribution system 16 may be exposed to higher temperatures than the powder storage unit 1. The secondary distribution system 16 may be made from more fire resistant materials than the unit 1. Either portion of the system 100, such as the powder storage unit 1 or the secondary distribution system 16, may have a fire resistant shield configured to cool the unit 1 and/or the system 16 down. The shield may include a cooling fluid circulation and/or a ceramic or other fire resistant material portion. The fluid system may include water, ice, nitrogen, the like, or a combination thereof.

Figure 3A:
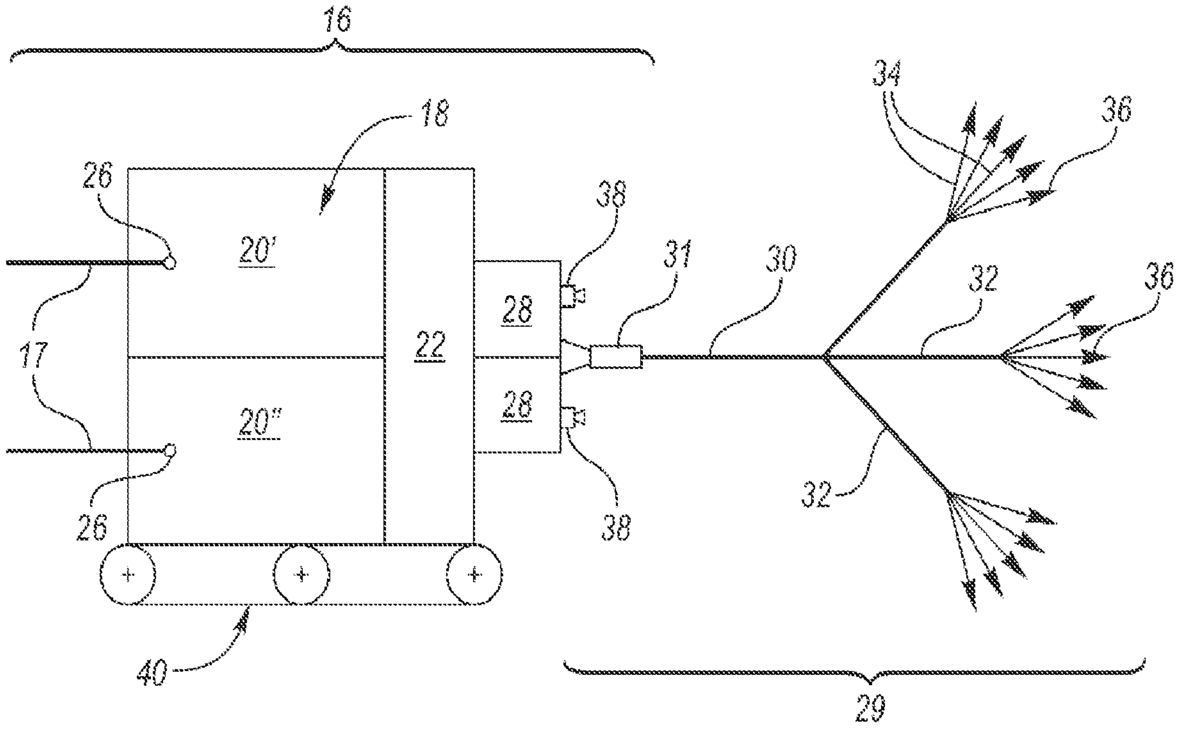
FIGS. 3A and 3B are schematic depictions of non-limiting examples of the secondary and tertiary powder distribution systems disclosed herein.
Figure 3B:
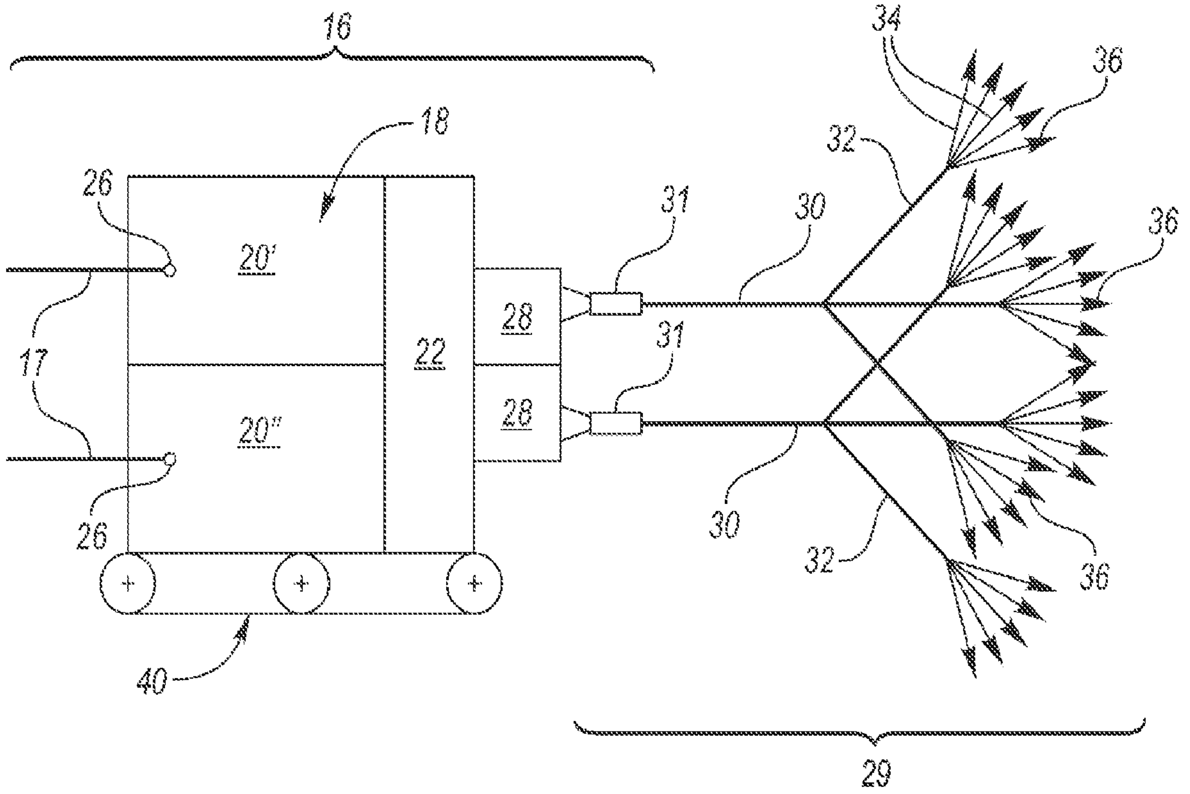

Non-limiting examples of the secondary powder distribution system 16 are shown in FIGS. 3A and 3B. The secondary powder distribution system 16 may include a body 18. The body 18 may be a mobile body. The body 18 may further include wheels, tracks, legs, arms, or another type of device enabling mobility 40. The body 18 may be moveable to and away from the vehicle 10.

The body 18 may include one or more compartments, tanks, or canisters 20 to temporarily hold the powder. The compartments 20 may be located adjacent to one another. The body 18 may further include a control center 22 including one or more computers, PLCs, HMIs, antennae, radio transmitters, Wi-Fi, Bluetooth, the like, or a combination thereof.

Each compartment 20 may receive powder from one or more powder storage units 1. For example, a first compartment 20' may be configured to receive powder only from a first powder storage unit 1', a second compartment 20" may be configured to receive powder only from a second powder storage unit 1", etc. The compartment 20 may be configured to receive powder from one or all powder storage units 1. For example, the first compartment 20' may receive powder from more than one powder storage units 1 during a first time period, and a second compartment 20" may receive powder from more than one powder storage units 1 during a second time period. The powder receiving may be triggered by a threshold value set on the scale 6. The first and second time periods may or may not overlap. The first time period may end before or at the same time that the second time period starts. In other words, the first and second compartments 20 may receive powder in an alternating fashion or at the same time.

Each compartment 20 may have the same or different dimensions than the remaining compartments 20. The compartments may be interconnected. Alternatively, the compartments 20 may be separate from one another. A compartment 20 may be configured to receive the same or different type, amount, weight, or a combination thereof of the powder than the remaining compartments 20. The compartment 20 may receive the powder via a hose 17 and one or more ports 26. The ports 26 may be powder pressure ports. Additionally, the compartment 20 may feature one or more additional ports 5 configured to provide air or air/nitrogen mixture to the secondary powder distribution system 16 as is shown in FIG. 3B.

The body 18 may further include one or more powder feed devices 28. Each powder feed device 28 may correspond to one compartment 20 and receive powder from the compartment 20. The powder feed device 28 may be configured to further distribute the powder to the tertiary powder distribution system 29. In one or more embodiments, the powder feed devices 28 may distribute the powder directly onto the fire with the tertiary powder distribution system being omitted.

The powder feed device 28 may have a connector 31 between the device 28 and the 30 tube. The connector 31 may be movable, adjustable, pivotable, or fixed. The connector 31 may be directed towards a fixed point. The connector 31 may be adjustable such that the tube 30 may be directed in various directions and/or angles. The angle may be from 0 to 180 degrees such that the powder application may cover the entire front field facing the system 100. The connector 31 may be an outlet from the body 18, the secondary powder distribution system 16, or both.

The tertiary powder distribution system 29 includes one or more distribution tubes 30, branches 32, subbranches 34, applicators 36, or a combination thereof, as is shown, for example, in FIGS. 3A and 3B, 4A-4C, and 5. The powder feed devices 28 may distribute the powder into a single common tube 30, example of which is shown in FIG. 3A. In an alternative embodiment, each powder feed device 28 may have its own set of branches 32, subbranches 34, and applicators 36, as is shown in an example of FIG. 3B. in FIG. 3B, each powder feed device 28 has its own tube 30 such that the amount of branches 32 and applicators 36 is greater than in the embodiment of FIG. 3A.

The tubes 30 may overlap, touch, be in contact with one another, be free of contact with one another, point in different directions, be positioned at different height, etc.

The one or more tubes 30 may branch out into a plurality of distribution branches 32. The distribution branches 32 may include sub-branches 34, each terminating with a powder applicator 36. The branches 32 and subbranches 34 may have the same or different configurations, shapes, dimensions, materials, or a combination thereof. The branches 32 and subbranches 34 may be symmetrical, asymmetrical, have a circular, regular, rectangular, or another cross-section. The branches 32, subbranches 34, or both may be further diverted, for example forming one or more loops within a branch 32 or subbranch 34. The loops may be circular, semicircular, oval, or having a different shape. The number of branches 32 and subbranches 34 may differ based on needs of a specific application. An example number of branches, subbranches, or both may be 2 to 10, 3 to 8, or 4 to 6.

The applicator 36 may be a gun, nozzle, tap, spout, pressurized jet. The applicators 36 may have a different shape, diameter, pattern of distribution openings, configuration. For example, every alternating applicator 36 may be the same.

The primary, secondary, and/or tertiary powder distribution system may further include one or more cameras or video recording devices 38. The devices 38 may include 2D cameras, 3D cameras, infrared cameras, ground clearance camera, the like, or a combination thereof. The devices 38 may be controlled remotely, by the control center 22, or both. The devices 38 may be placed on the powder storage unit 1, the body 18, the powder feed device 28, the tube 30, the branch 32, the subbranch 34, or a combination thereof.

Figure 4A:
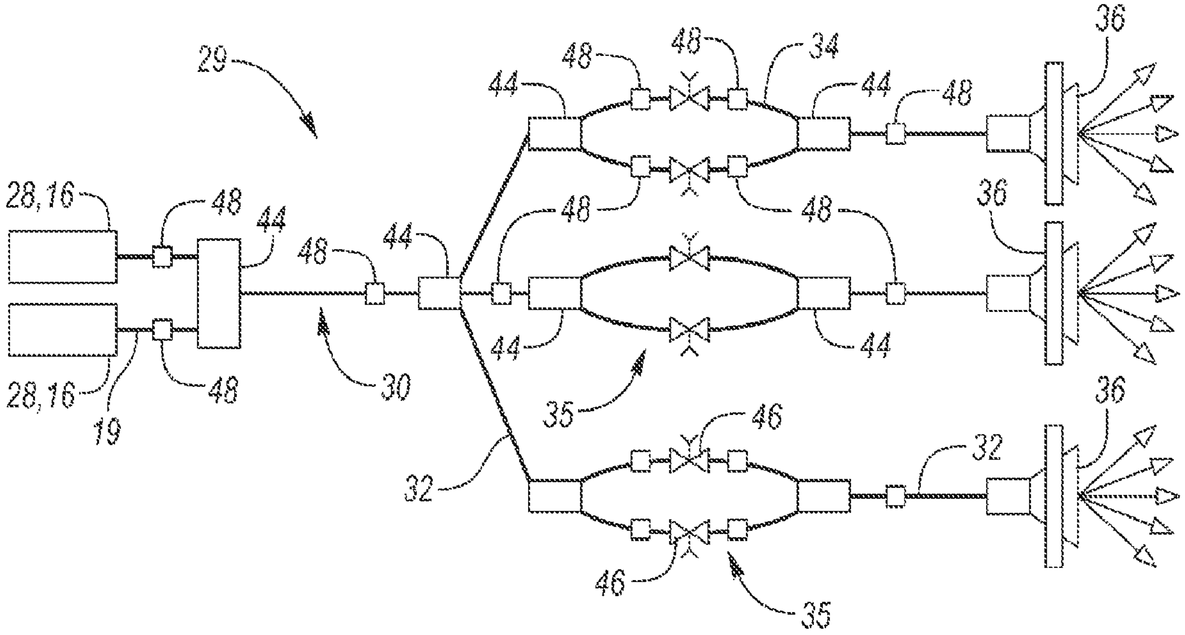
FIG. 4A through 4C are schematic depictions of non-limiting examples of the tertiary powder distribution system.
Figure 4B:
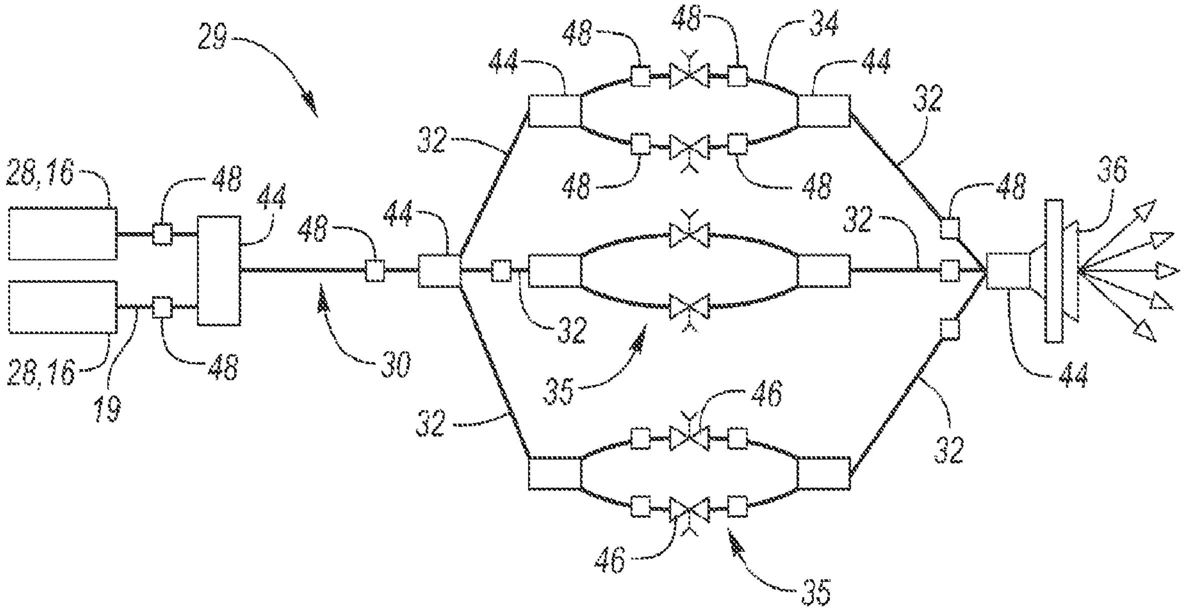
Figure 4C:
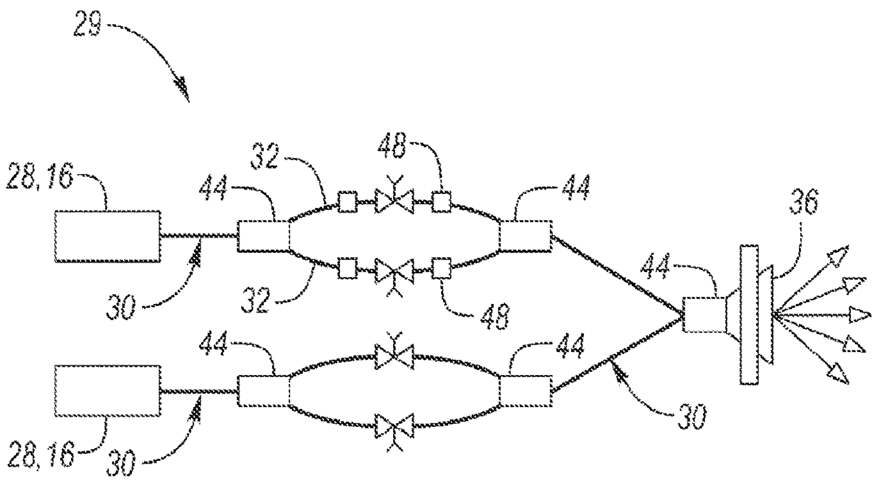

A non-limiting example of the tertiary powder distribution system 29 is also depicted in FIGS. 4A through 4C. The tertiary powder distribution system 29 may emerge from one or more powder feed devices 28 of the system 16. The powder feed devices 28 may be connected to a tube 30 via another connection hose, tube, or tubing 19, and/or via a diverter 44. The branches 32, subbranches 34, or both may have different configurations and shapes. For example at least one of the branches 32 may include at least one subbranch 34 having a loop or a circuit 35.

The tertiary distribution system 29 may include one or more diverters 44, strategically, intentionally, or deliberately placed within the system to allow flexibility within the system to distribute or stop distribution of the powder as desired. For example, the diverters 44 may be placed on the tube 30, branches 32, subbranches 34, or a combination thereof. The diverters 44 are configured to prevent or allow influx of the powder in the tube 30, branch 32, subbranch 34, applicator 36, or a combination thereof by closing and/or opening a gate or another mechanical part within the diverter 44.

The diverter 44 may be a diverter valve configured to allow diversion of the powder in one of a plurality of directions when the diverter is switched one way and in a second direction when the diverter is switched another way. The switching may relate to opening and closing associated with a mechanical restrain inside the diverter, for example opening or closing of a gate or another mechanical part within the diverter. The diverter 44 may be a mechanical device. The diverter 44 may be a single-valve or T diverter, two-way diverter, three-way diverter, or the like. The diverter 44 may be controlled, uncontrolled, or an automatic diverter. The diverter 44 may respond to a command from the control center 22 or another system such as a remote system. The diverter 44 may respond to a pressure induced into the system 100 disclosed herein, for example via one or more ports 5.

The tertiary distribution system 29 may include one or more additional valves 46. The additional valves 46 may include butterfly valves, ball valves, gate valves, globe valves, needle valves, the like, or a combination thereof. The additional valves 46 may include powder release valves, powder transfer time valve, etc. A non-limiting example of the diverter valves 44 and other types of valves is depicted in FIGS. 4A-4C.

While in FIG. 4A, each branch 32 outputs the powder via a separate gun 36, in FIG. 4B, the powder distribution system includes branches 32 meeting at a point of entry to a single gun 36. In FIG. 4C, each powder feed device 28 connects to the one or more guns 36 via the main tube 30 which branches into a loop 35 formed by branches 32. The main tube 30 continues past the loop 35 and individual tubes 30 originating in the individual powder feed devices 28 meet at an entry point to one or more guns 36. While only one gun 36 is depicted, the valve 44 immediately adjacent to the gun 36 may branch into further subbranches, each terminating with a gun 36.

The primary, secondary, and/or tertiary distribution system may include one or more sensors 48. The one or more sensors 48 may be powder flow sensors. The sensors 48 may provide information or signal about the powder flow to the control center 22 or another system such as a remote system. The information or signal may be input for the control center 22 or another system programmed to accept the input. The input may include information about the amount of flow, change in the flow, whether the flow is on or off. The sensor 48 may be located in various locations in the primary, secondary, and/or tertiary distribution systems. Non-limiting example placement of the sensors 48 within the tertiary distribution system 29 is shown in FIGS. 4A-4C. Other types of sensors 48 may be also included, for example ground clearance sensors.

Figure 5:
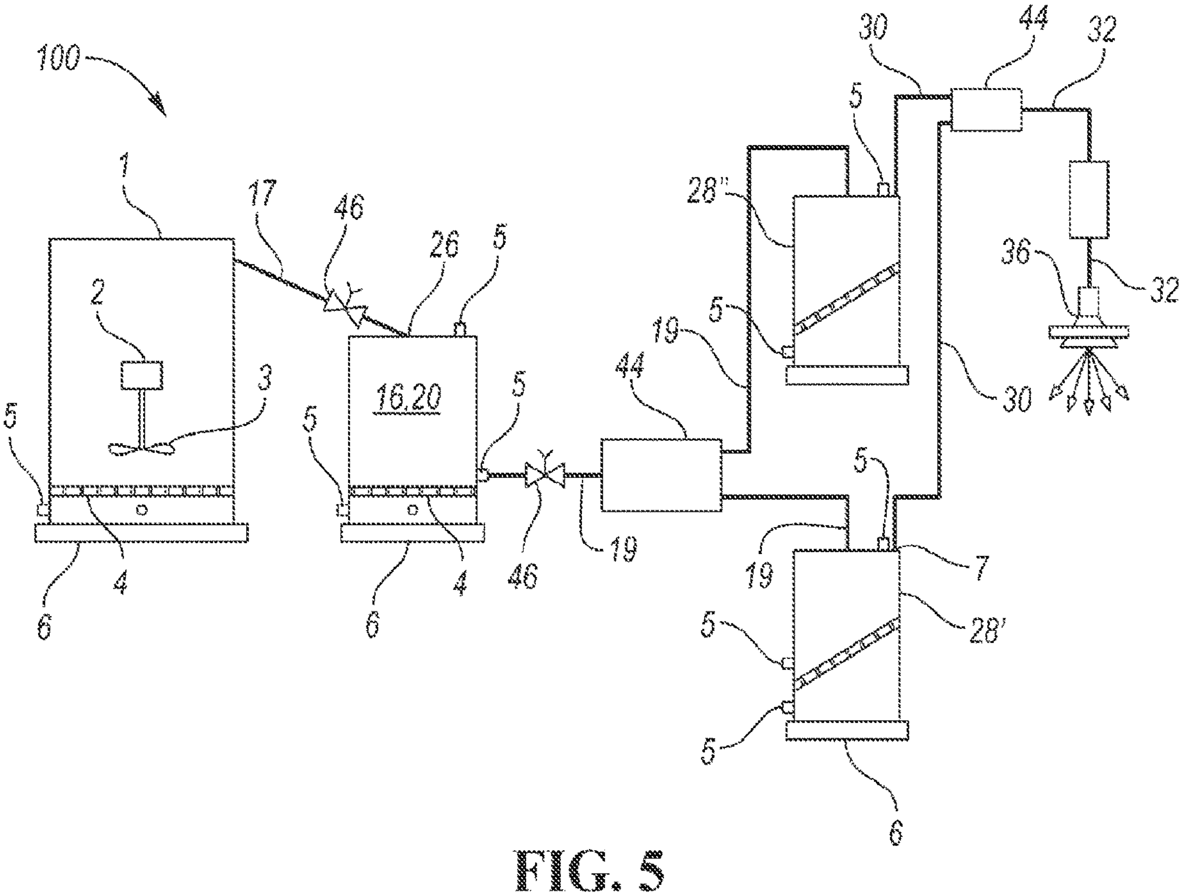
FIG. 5 is a schematic depiction of a non-limiting example of the fire extinguishing system disclosed herein.

In another non-limiting example of FIG. 5, the extinguishing system 100 is shown with the powder storage unit 1 having a stirrer 3 run by a motor 2. The unit 1 has a fluidization plate 4 with a port 5 and a weight scale 6. The powder is fluidized in the unit 1 and supplied to the secondary powder distribution system 16 via a hose 17. The hose 17 may include one or more valves 46. The secondary powder distribution system 16 may include several portions which are not immediately adjacent to one another. For example, the canister 20 may be configured to accept the powder via the hose 17 and an inlet or port 26. The canister 20 may be spatially distanced or removed from one or more powder feed devices 28. The connection between the canister 20 and the powder feed devices 28 may be provided via a hose 19, one or more diverters 44, one or more valves 46, or a combination thereof. The diverter valve 44 on the hose 19 may switch powder distribution to the first powder feed device 28' or the second powder feed device 28". Each powder feed device 28 may have a powder inlet 26 and powder outlet 7.

The fire extinguishing system 100 may further include a fluidization plate 4, port 5 configured to allow influx of air for the fluidization, and/or the scale 6 in the secondary powder distribution system 16, the one or more powder feed devices 28, or a combination thereof. Inclusion of items 4,

5, and/or 6 in the secondary powder distribution system 16 may assist with the smooth, continuous, fluid movement of the powder through the system 100. The multiple scales 6 also enable control, monitoring, or maintenance of a certain volume or weight of the powder within individual parts of the system 100. Example weight to be monitored by the system 100 may be a minimal and/or maximum set point or predetermined weight of the powder to be loaded into the unit 1, distributed to the compartment 20, powder feed device 28, or a combination thereof.

The system 100 may also encompass one or more devices for fluidization of the powder in one or more units of the system 100. The one or more devices may include an air compressor 50. The compressor 50 may receive an influx of air. The air may originate in the environment at the site of the air compressor. The air compressor 50 may compress the air to a desirable degree of pressure. The one or more devices may further include an air preparation unit 52. The air preparation unit may accept the compressed air from the compressor 50. The air preparation unit 52 may adjust one or more properties of the air such as humidity. The air preparation unit 52 may be configured to lower the air humidity to a desired or predetermined degree. The air preparation unit 52 may include one or more air filters, water drainers, desiccants, or a combination thereof.

The one or more devices may further include a nitrogen generator 54. The nitrogen generator 54 may be configured to accept air from the environment, separate nitrogen from oxygen and release oxygen back to the environment. Alternatively, the source of nitrogen may be a nitrogen supply source such as a nitrogen tank 56. The devices may also include an air/nitrogen mixing unit 58. Each one of the devices may have at least one inlet and outlet. The nitrogen generator 54 may have an air inlet, nitrogen outlet, and an outlet configured to release air components except the nitrogen. The generated and/or supplied nitrogen may be in a gas or liquid state.

Figure 6:
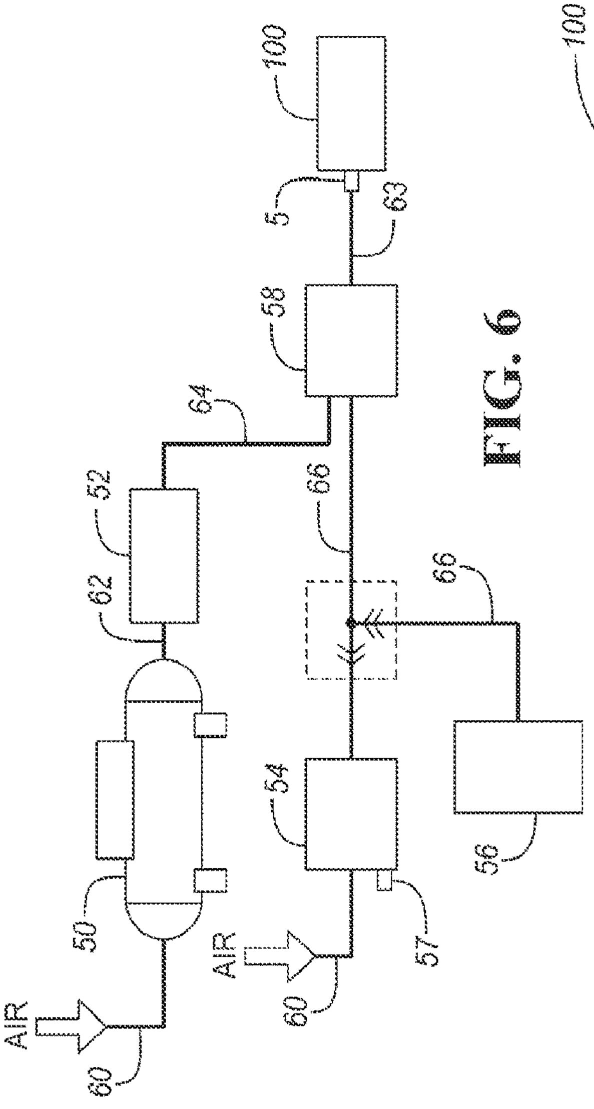
FIG. 6 is a schematic depiction of a fluidization system which may be used to support the fire extinguishing system disclosed herein.

A non-limiting example of the one or more devices incorporated into the system 100 is shown in FIG. 6. In FIG. 6, the air from the atmosphere or environment at a site is provided via an air supply hose 60 to the air compressor 50. A high pressure air hose 62 leads the pressurized air from the compressor 50 to the air preparation unit 52, where the air's humidity is adjusted to a predetermined, calculated, desirable value. Dry, compressed air is lead from the air preparation unit 52 to the air/nitrogen mixing unit 58 via a hose 64. The supply line 62 and the dry air supply line 64 may be high pressure hoses.

Another air supply hose 60 may lead the air into a nitrogen generator 54, where nitrogen is separated from oxygen and other components of air. The other components such as oxygen may be released via an outlet 57 to the environment. Alternatively or in addition, nitrogen may be supplied via a supply line 66 from a nitrogen source, for example the nitrogen tank 56. A line 66 may lead nitrogen to the air/nitrogen mixing unit 58. The line 66 may be a high pressure hose.

The nitrogen supply line 66 and the compressed, dry air supply line 64 may connect to the air/nitrogen mixing unit 58. The mixing unit 58 is configured to produce nitrogen/air mixture suitable for fluidization of the powder used in the system 100. The nitrogen/air mixture may enter the system 100 via one or more high pressure hoses 63, one or more ports 5, or a combination thereof. The air or the nitrogen/air mixture may be supplied to the system 100 via one or more ports 5 in the powder storage unit 1, the secondary powder distribution system 16, the one or more powder feed devices 28, or a combination thereof. Air from the environment, from the air compressor 50, from the air preparation unit 52, and/or the air/nitrogen mixture from the mixing unit 58 may be also supplied to the one or more guns 36 in the tertiary powder distribution system 29.

Figure 7:
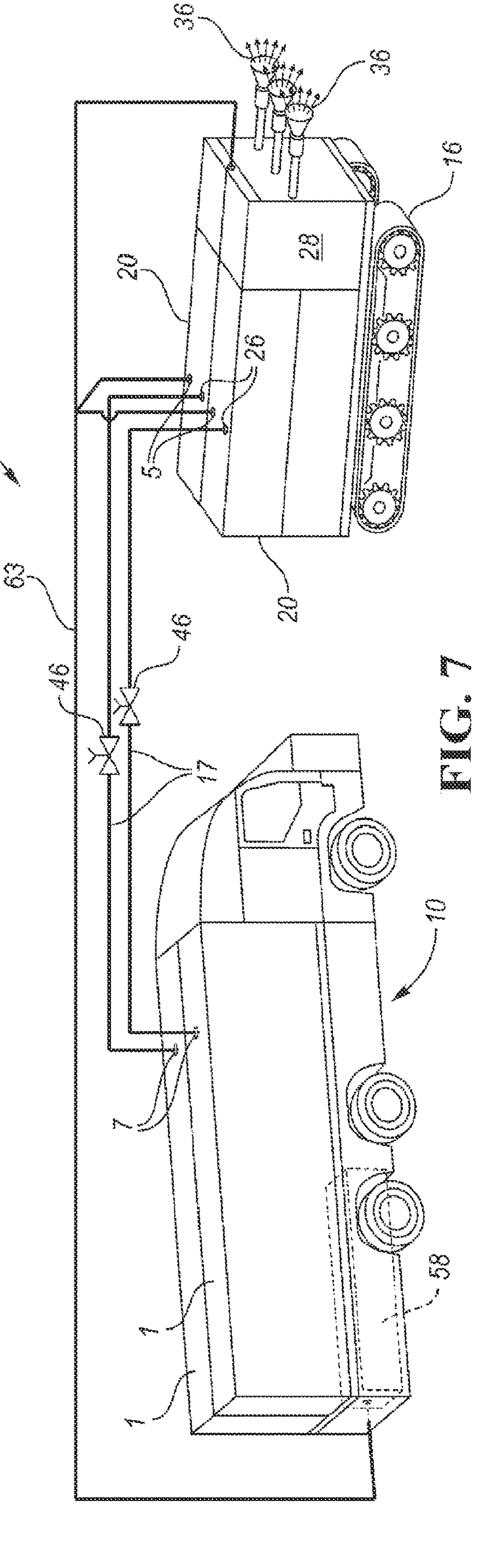
FIG. 7 is a schematic perspective view of a non-limiting example of the fire extinguishing system including a vehicle carrying the primary powder distribution system and a separate mobile body carrying the secondary and tertiary powder distribution systems.

An alternative view of a non-limiting example of the system 100 is depicted in FIG. 7. FIG. 7 shows the system 100 including a vehicle 10 having multiple powder storage units 1, a source of air/nitrogen mixture such as the mixing unit 58 incorporated within the body of the vehicle 10 or attached to the bed of the vehicle 10. The air/nitrogen mixture is delivered inside one or more units 1 via one or more ports 5. The powder is then fluidized and exits via one or more outlets 7 from each unit 1. The fluidized powder then proceeds towards the secondary powder distribution unit 16 via one or more hoses 17. The hoses 17 may feature one or more diverters 44, valves 46, or both.

The powder may enter the one or more compartments 20 of the secondary powder distribution system 16 via one or more ports 26. The air/nitrogen mixture may also enter the one or more compartments 20, the one or more powder feed devices 28, or both via one or more ports 5 and a high pressure hose 63. The powder is distributed from the one or more compartments to the one or more powder feed devices 28. A tertiary powder distribution system 29 is configured to distribute the powder and apply the powder via one or more applicators 36 onto a fire, fire-affected area, or an area designated to be preventatively protected against fire with the powder application.

Figure 8:
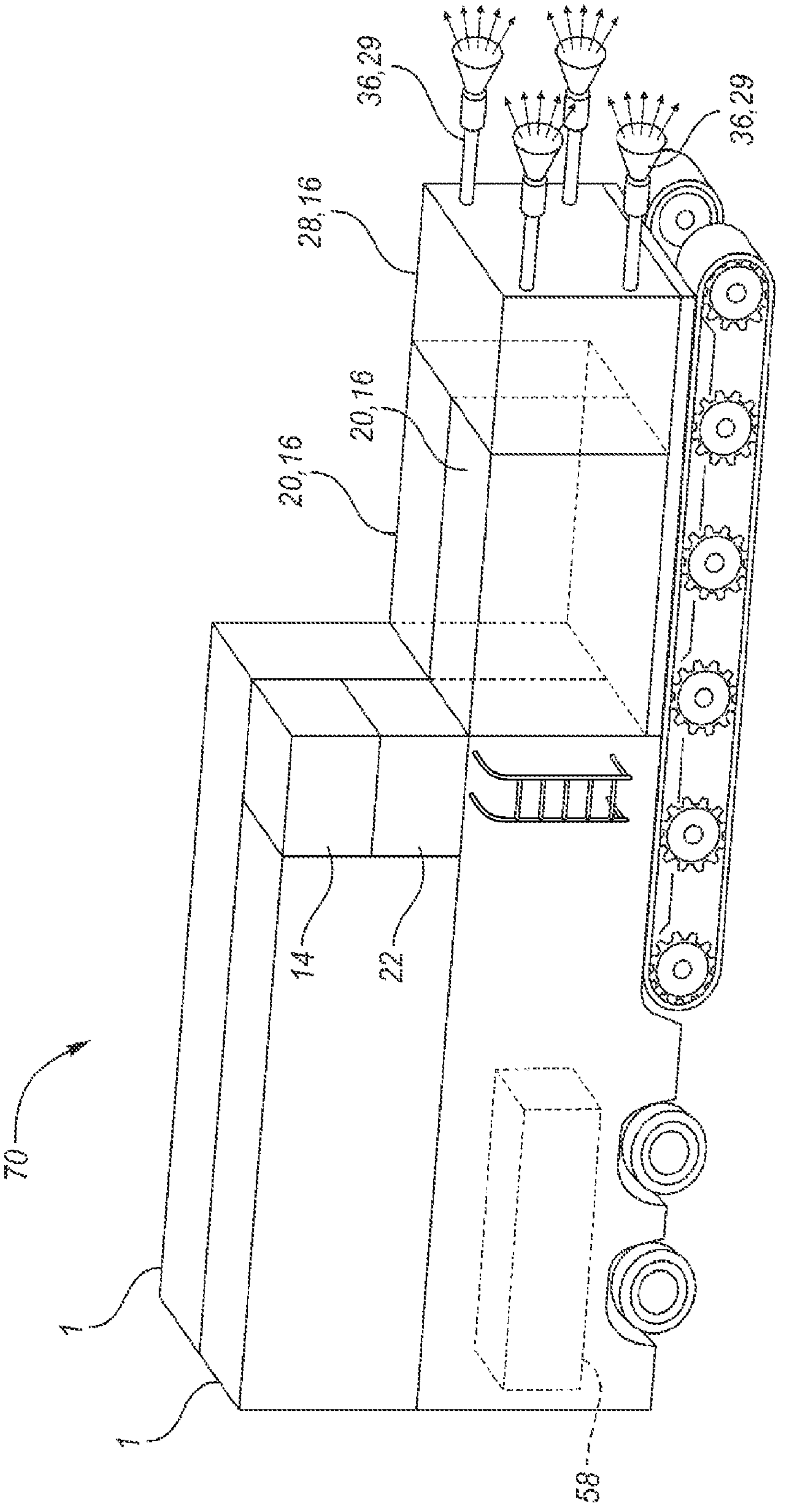
FIG. 8 is a schematic perspective view of another non-limiting example of the fire extinguishing system including a mobile unit having the primary, secondary, and tertiary powder distribution systems combined.

In yet another embodiment shown in FIG. 8, the primary, secondary, and tertiary powder distribution units 1, 16, and 29 are combined. In the combined embodiment, the mobile unit 70 includes one or more features of the primary, secondary, and tertiary powder distribution units 1, 16, and 29. A source of air/nitrogen mixture such as the mixing unit 58 may be incorporated in the mobile unit 70. The mobility of the unit 70 may be provided by one or more types of mobile devices including wheels, tracks, legs, arms, etc. The mobile unit 70 may include a cabin 14, a control center or unit 22, one or more compartments 20, one or more powder feed devices 28, one or more applicators 36, or a combination thereof. The mobile unit 70 may include one or more additional features disclosed herein with connection with the system 100.

The powder may be transported by gravity, for example when the unit 1 is located higher than the compartments 20, the powder feed devices 28, and the applicators 36, and/or when the vehicle 10 or mobile unit 70 is located, parked at an incline. Alternatively, the powder may be moved under pressure. A pressure sensor and/or a pressure release valve may be employed to assist with monitoring and controlling of the high pressure built up in the system 100. When the required pressure for the powder transfer via the system 100 is reached, in response to a pressure transducer, the control center 22 may command the pressure release valve to open and the powder may be transported to various parts of the system 100.

The system 100 may include one or more controllers. The controllers may be remote, located in the control center 22, or both. The controllers may be programmed to control the system 100, mobile unit 70, or one or more of their portions. The controllers may be programmed to provide input to, receive input from one or more portions of the system 100, mobile unit 70, or both. The controllers may be programmed to control the amount of powder to be loaded into the system, unit 1, the secondary powder distribution system 16, and/or distributed via the tertiary powder distribution system to one or more applicators. The controllers may be programmed to control opening and closing of one or more valves such as pressure release valves, diverter valves, powder transfer time valve, etc. The controllers may be programmed to receive input from one or more sensors and/or cameras installed within the system 100 and/or adjust one or more actions of the system 100 based on the received input.

The controller(s) may be programmed to, in response to a predetermined pressure within the system 100 being reached, command the pressure release valve to open such that the powder may be transferred via one or more diverters to various portions of the system 100. The controller(s) may be programmed to, in response to a predetermined weight of the powder in one or more portions of the system 100, to prevent or allow influx, transfer, or movement of the powder into the, out of, or within the system 100.

The system 100, via one or more controllers, may be configured to communicate with additional systems 100, human operators within the mobile unit 70, vehicle 10, on the ground of a hazard zone, or outside of the hazard zone in a safe zone. The hazard zone may be defined as an area having a parameter within which a fire has occurred, is expected to occur, is spreading, or is in imminent danger of developing. The hazard zone may include one or more structures, vegetation, animals, humans, real property, personal property, or a combination thereof, which are under a threat of being destroyed, harmed, or killed by a fire.

The system 100 may be introduced into the hazard zone without introducing an additional human element such as firefighters or operators to the hazard zone at the same time. The communication with the system 100 may be provided entirely from outside of the hazard zone. The system 100 may be operated remotely via one or more networks, satellites, weather balloons, or a combination thereof.

Figure 9:
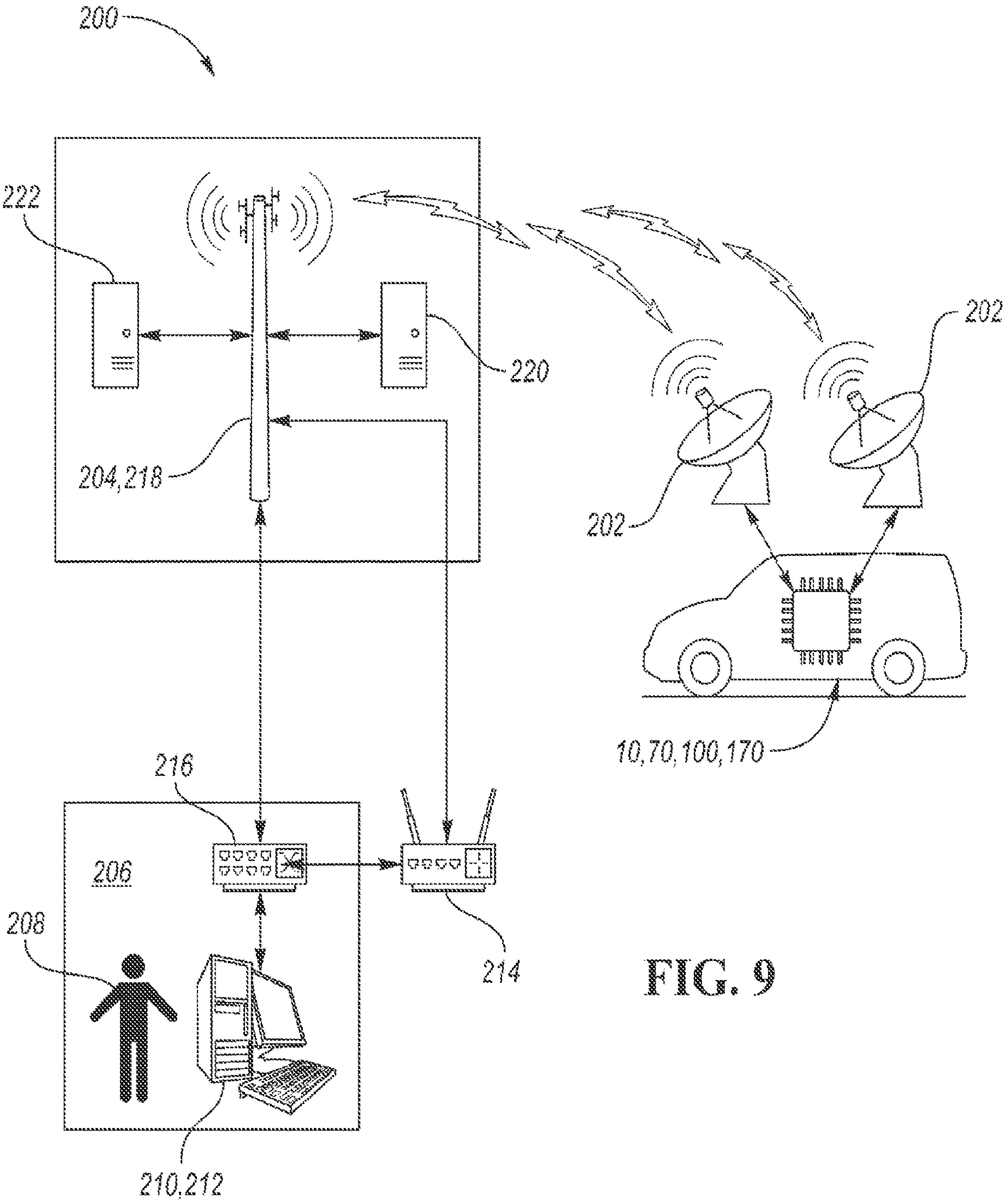
FIG. 9 is a schematic depiction of the fire extinguishing system in a vehicle/mobile unit in connection with a remote control station or vehicle operable from outside a fire hazard zone, the system configured to employ cell towers to facilitate communication.

In a non-limiting example of FIG. 9, a fire extinguishing system 200 is disclosed. The system 200 utilizes a network. The system 200 includes the vehicle 10 or mobile unit 70 carrying the system 100 disclosed herein. The system 100 may be incorporated in a hazard fighting vehicle or mobile unit 170. The vehicle or unit 170 may be autonomous, semi-autonomous, remotely driven by the operator 208 at a remote control station or vehicle 206. The vehicle or unit 170 may include one or more antennae 202 such as an LTE antenna, GPS antenna, the like, or a combination thereof. The vehicle or unit 170 may include a GPS system configured to assist with navigation of the vehicle or unit 170. The vehicle or unit 170 may collect and transmit sensory data over an LTE network using its LTE antenna. LTE refers to Long Term Evolution and relates to a type of 4G network. Other networks usable for the same purpose are contemplated instead of or besides LTE.

Besides the system 100 incorporated in the vehicle or unit 170, the fire extinguishing system 200 includes one or more cell towers 204. The cell towers 204 may be stationary, permanent, temporary, or deployable into or in the vicinity of the hazard zone. The cell tower 204 may provide signal to the antennae 202. The cell tower 204 may be connected to, communicate with, provide input to, receive input from a remote control station or vehicle 206. The connection may be wired, wireless, or both. The station or vehicle may include one or more operators 208, computers 210, controllers 212, antennae 214, ethernet bridges 216, or a combination thereof.

The operator 208 may operate the system 100 from outside the hazard zone, that is from a safe location. The operator may use the computer 210 with a custom user interface, controllers 212, etc. The computer 210 may send and/or receive signals to the system 100 via the cell tower 204.

The cell tower 204 may be deployable such that the tower 204 may be located at a desirable, predetermined location. The cell tower 204 may transmit and/or receive communication between the remote control station or vehicle 206 and the system 100. The communication may be provided via a private band LTE network or otherwise. The cell tower 204 may include an LTE gateway or base station 218, evolved packer core (EPC) 220, and spectrum allocation system (SAS) 222.

The LT gateway or base station 218 may be equipped with carrier aggregation and one or more advanced features. The SAS 222 may authorize use of the cell tower 204. The SAS 222 may work with a database to store licenses, access information, analyze the RF spectrum and channels to avoid any interference with the incumbents, and enabling use of an available RF spectrum.

The EPC 220 may be the main controller of the LTE network. The EPC 220 may maintain a user database, enforce policies, allocate IP addresses, manage mobility and tracking, provide a gateway to one or more Public Data Networks.

Figure 10:
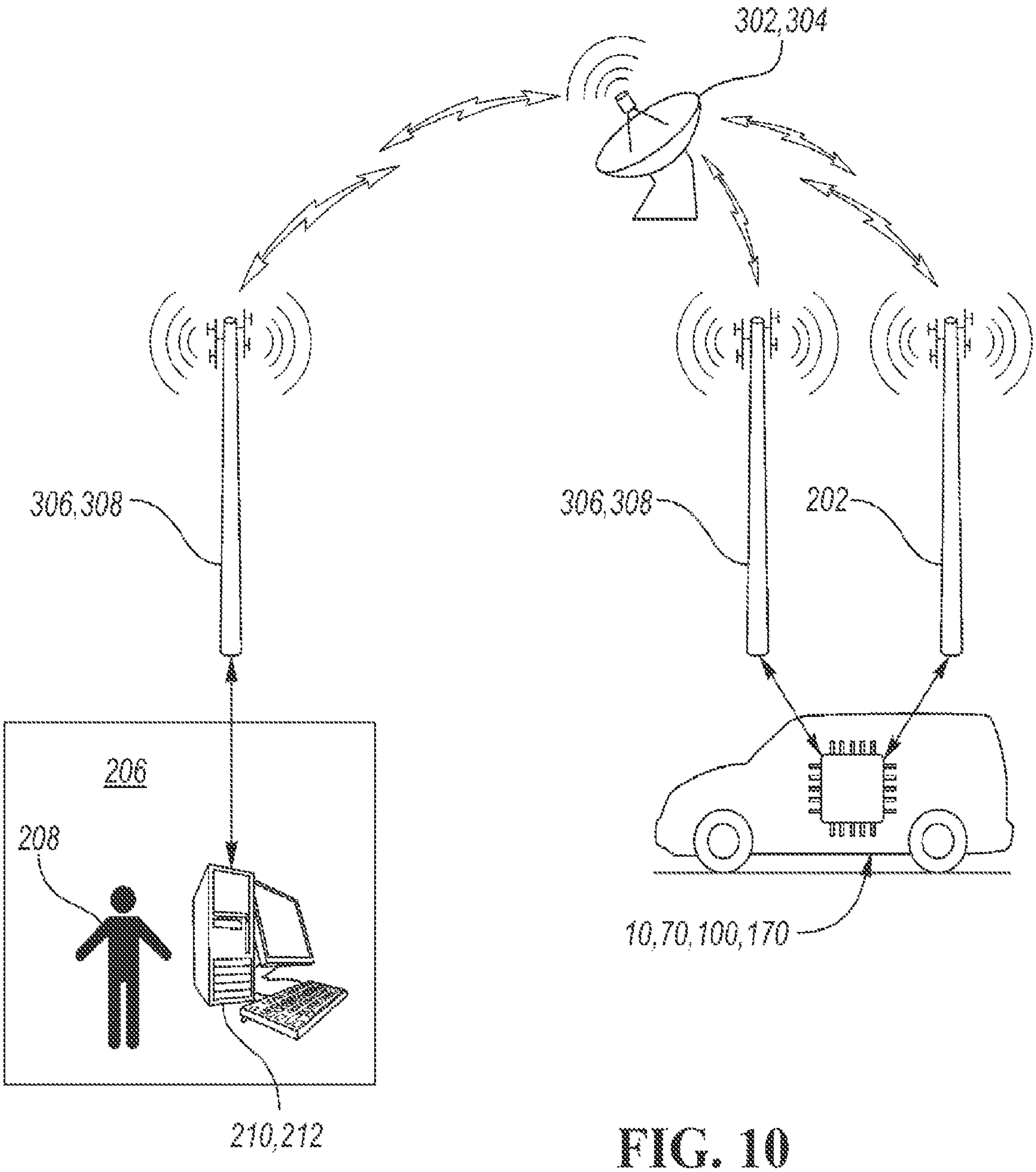
FIG. 10 is a schematic depiction of the fire extinguishing system in a vehicle/mobile unit in connection with a remote control station or vehicle operable from outside a fire hazard zone, the system configured to employ satellites and/or weather balloons to facilitate remote connection.

In an alternative embodiment, a fire extinguishing system 300 is disclosed and schematically depicted in FIG. 10. The system 300 utilizes one or more satellites 302, weather balloons 304, or both. The satellite 302 may be a communication satellite in orbit configured to enable communication between the system 100 and an operator 208. The satellite 302 may be an artificial satellite that relays and amplifies radio telecommunication signals via a transponder, creates a communication channel between a source transmitter 306 and a receiver 308 on Earth. The vehicle 10, mobile unit 70, a hazard fighting vehicle or mobile unit 170, the remote station or vehicle 206, or a combination thereof, may be equipped with a transmitter 306, a receiver 308, or both.

Alternatively, or in addition to the satellite 302, the system 300 may utilize one or more weather balloons 304 to facilitate communication between the system 100 and the remote control station or vehicle 206. Weather balloons 304 are a type of high-altitude balloons that carry instruments aloft to send back information on atmospheric properties. Weather balloons 302 may function as very high antennae. As such, the weather balloons 304 may be used to lift wireless communication platforms and used to facilitate communication between a source transmitter 306 and a receiver 308 on the surface.

The system 300 may include the system 100 incorporated within a vehicle 10, mobile unit 70, or a hazard fighting vehicle or mobile unit 170, as described above with respect to the system 200. The system 300 may include the system 100, a remote control station or vehicle 206, and the communication satellite 302, weather balloon 304, or both.

The remote control station or vehicle 206 may be as described above. An operator 208 may coordinate and control the system 100 remotely from the station or vehicle 206. The station or vehicle 206 may include one or more computers 210, controllers 212, and the like, which may be programmed to send signals to the system 100, receive signals from the system 100, or both via the satellite 302, weather balloon 304, or both.

The communication may be also used by the operator 208 to coordinate additional efforts such as transportation and refilling of the vehicles/mobile units with the powder. The refilling may be conducted remotely, for example from a drone or another remote-controlled device.

The herein-disclosed system has numerous advantages over traditional fire extinguishing systems. For example, the system uses no water for extinguishing the fire so that the hydrogen and oxygen from dissociation of water do not contribute to the fire growth. Since the system utilizes one or more powders, the system is able to diminish and extinguish fires at any location with a smaller volume of extinguishing material than traditional water-utilizing methods and systems, and is not dependent on a water source nearby a fire location. Additionally, the system does not require human presence at a location of the fire. As such, the system can prevent firefighter injury and loss of life. Additionally still, since the system may be entirely void of manpower present in the hazard zone, the herein-disclosed fire extinguishing system may be employed at virtually any location as long as the location is accessible by a vehicle capable of carrying and transporting the first, second, and/or third powder distribution systems.

In one or more embodiments, a method of using the described fire extinguishing system is disclosed herein. The method may include identifying a fire at a location, designated as a hazard zone, and preparing a vehicle 10, mobile unit 70, or a hazard fighting vehicle or unit 170 with the on-board fire suppression or extinguishing system 100 to fight the fire. The method may include installing, connecting to, or releasing one or more deployable cell towers 204, satellites 302, weather balloons 304, or a combination thereof. The method may include establishing a wired and/or wireless network and connection between the vehicle/mobile unit and a control center such as a remote control center or vehicle 206.

The method may include dispatching the vehicle/mobile unit to the location of the fire, remotely operating the vehicle/mobile unit to contain, extinguish, control, minimize, or otherwise subdue the fire. The method may include collecting information about the fire by means of one or more devices the vehicle/mobile unit is equipped with such as cameras, sensors, or the like. The method may include providing the information and/or other signals to a system located at a remote location, from which the system 100 aboard the vehicle/mobile unit is being controlled. The method may include providing and accepting signals from the remote location to the system 100 and vice versa. The method may include transmitting signals by means of transmitters, receives, antennae, deployable cell phone towers, satellites, weather balloons, or a combination thereof between the control center and the vehicle/mobile unit.

The method may further include deploying more than one vehicle/mobile unit to the fire and coordinating, controlling, and communicating with the vehicles/mobile units. The method may include enclosing the fire with a number of the vehicles/mobile units to target the fire from more than one location. The method may include positioning the vehicles/mobile units, remotely, to strategically contain the fire while minimizing property damage, loss of life, and/or damage to the vehicles/mobile units.

Alternatively, the method may include dispatching at least vehicle/mobile unit with an operator inside the cabin. This method may be applicable especially, for example, when the cabin is located in a vehicle including the powder storage unit 1 and the secondary and tertiary powder distribution units 16 and 29 are located separately on a different mobile unit such that the vehicle with the cabin housing the operator may remain at a relative distance from the fire and/or the hazard zone. The method may include distributing the powder from the unit 1 via a hose 17 having such length that the powder remains in its fluid state during the distribution, but the operator is kept in relative safely.

The method may include preparing the vehicle/mobile unit. The preparing may include filling the powder storage unit 1 of the vehicle/mobile unit with the powder described herein. The method may include fluidizing the powder in the unit 1, maintaining the powder as fluidized bed, distributing the powder to the secondary powder distribution system 16, and applying the powder onto the fire via the tertiary powder distribution system 29. The distributing may include releasing the powder from one or more units 1, containers 20, powder feed devices 28, guns or applicators 36. The releasing may be continuous, interrupted, timed, repetitive, in spurts, coordinated between the units 1, containers 20, powder feed devices 28, guns or applicators 36. The releasing may be conducted in such a manner that, for example, a first unit 1 may release the powder while a second unit 1 may be in an off mode. The releasing from the units 1 may be then switched such that only powder from the second unit 1 is being released. The same alternating principle may be applied to the one or more containers 20, powder feed devices 28, guns or applicators 36, and other vehicles and mobile units.

The powder distributing may also include directing the vehicle/mobile unit or one or more of its portions in the desirable, predetermined direction. The direction may be predetermined by a controller based on information collected and provided by the system 100. For example, the method may include collecting visual, thermal, or other data by one or more sensors, cameras, or both incorporated within the vehicle/mobile unit, and providing the data to the controller. The controller may be incorporated in the vehicle/mobile unit or be located remotely. In response to the data received, the controller may be programmed to generate predetermined responses regarding fire response strategies, generate new strategies, generate recommendations, or the like. The user, based on the data may determine the best course of action and coordinate the one or more vehicles/mobile units to form a response to the conditions at the location of the fire or the hazard zone.

The method may include using a number of vehicles/mobile units at the same time or alternatively. The method may include refilling the one or more vehicles/mobile units at the hazard zone. The method may include removing the one or more vehicles/mobile units from the hazard zone, keeping them in the hazard zone temporarily or permanently. The method may include stationing one or more vehicles/mobile units in an area of a potential fire, actual fire, imminent fire, in the hazard zone, outside of the hazard zone.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A powder fire extinguishing system comprising:

a powder storage unit including a fluidization plate configured to fluidize powder in the powder storage unit, a remotely controllable mobile body, located downstream from and connected to the powder storage unit which is spatially removed from the mobile body and connected to the mobile body at least via one powder carrying hose, wherein the powder storage unit has a pressurized port configured to receive an air/nitrogen mixture for powder fluidization, said mobile body having a container, configured to accept the fluidized powder, and a powder feed device located downstream from the container, configured to distribute the fluidized powder to a tube via a pivotable connector; and the tube branching into a powder distribution system including a plurality of branches, each branch of the plurality of branches terminating with a plurality of powder applicators.

2. The system of claim 1, wherein at least one branch of the plurality of branches comprises a loop and at least one diverter configured to control the fluidized powder to flow via the loop.

3. The system of claim 1, wherein the container comprises a fluidization plate.

4. The system of claim 1, wherein the powder storage unit is mobile.

* * * * *